Nov. 5, 1968

P. E. GAGE 3,408,829

DRIVE APPARATUS

Filed May 19, 1966

INVENTOR.
Paul E. Gage
BY
Synnestvedt + Lechner
ATTORNEYS

Nov. 5, 1968     P. E. GAGE     3,408,829
DRIVE APPARATUS
Filed May 19, 1966     3 Sheets-Sheet 2
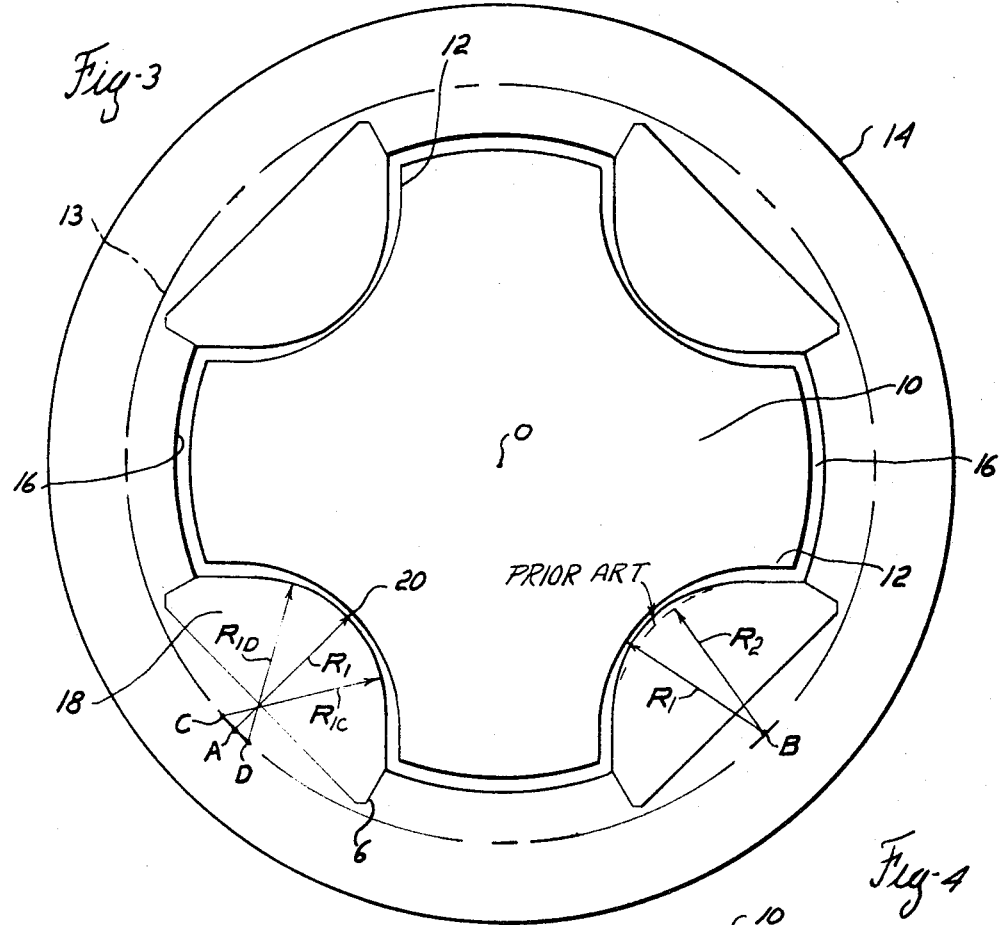
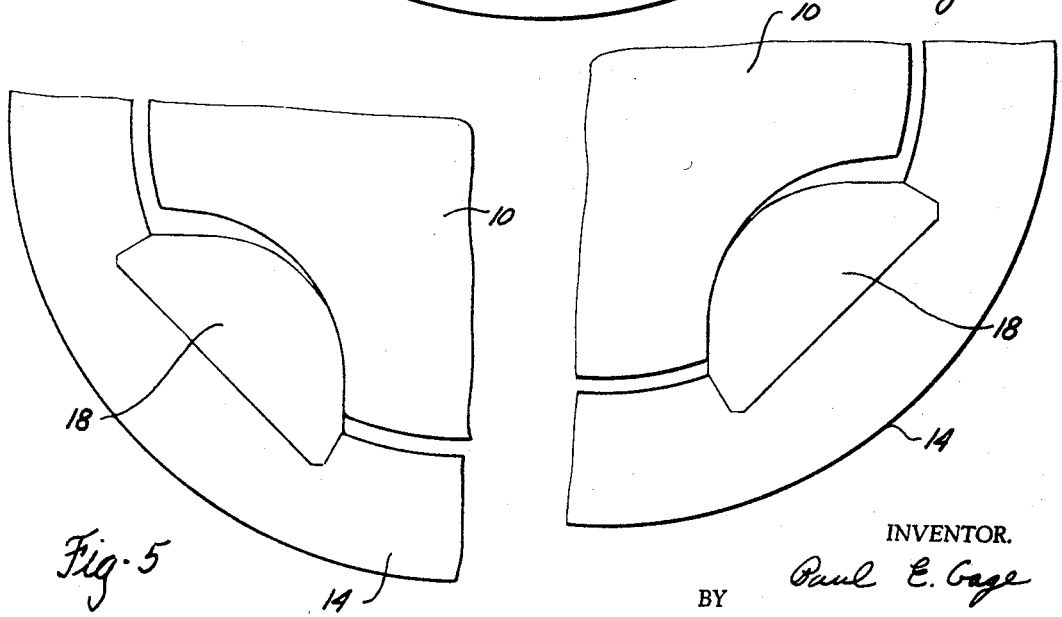
INVENTOR.
Paul E. Gage
BY
Synnestvedt & Lechner
ATTORNEYS United States Patent Office 3,408,829
Patented Nov. 5, 1968

3,408,829
DRIVE APPARATUS
Paul E. Gage, Wyomissing, Pa., assignor to The Polymer Corporation, a corporation of Pennsylvania
Filed May 19, 1966, Ser. No. 551,359
7 Claims. (Cl. 64—9)

ABSTRACT OF THE DISCLOSURE

A drive apparatus having a relatively telescoping shaft and sleeve member, the shaft having a plurality of axially extending grooves and the sleeve member having sufficient teeth projecting from the interior thereof so that one tooth extends into each groove in the shaft, wherein a drive surface on such a tooth is complementary to a drive surface on its cooperating groove and wherein these drive surfaces are congruent when they are in driving inter-engagement.

---

This invention relates generally to a driving connection between relatively telescoping shaft and sleeve members of the kind wherein a plurality of teeth in one cooperate with a plurality of groovs in the other.

In prior shaft and sleeve devices of this kind, each tooth is in line contact with its cooperating groove when they are in driving inter-engagement.

When such a connection is used in the driving mechanism of a rolling mill (the sleeve in such context is commonly denoted a "coupling box") to connect the wobbler of a roll with a spindle transmitting power from a power source, line contact results in excessive wear, which shortens the life of the coupling box.

The invention greatly reduces the problem of excessive wear by providing surface, rather than line, contact between the drive surface of each tooth and the corresponding drive surface of the cooperating groove when they are in driving inter-engagement.

The primary object of this invention is to reduce the wear and thereby increase the life of a connection of the kind described.

Other objects, both general and specific, and a more complete understanding of this invention may be had by referring to the following description and claims, taken together with the accompanying drawings, in which:

FIGURE 3 is an end view, on an enlarged scale, of the coupling box and wobbler shown in FIGURE 2;

FIGURE 4 is a fragmentary end view of the coupling box shown in FIGURES 2 and 3 with the wobbler and coupling box rotating counterclockwise and in driving inter-engagement with each other;

FIGURE 5 is a fragmentary end view of the coupling box shown in FIGURES 2 and 3 with the wobbler and caupling box rotating clockwise and in driving inter-engagement with each other;

Figure 1:
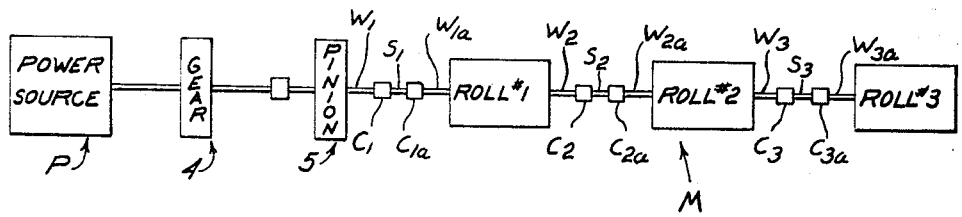
FIGURE 1 is a schematic view of a rolling mill of the kind which includes a coupling box embodying the invention.

While other drive mechanisms may embody the invention, it is particularly useful in a rolling mill drive and is therefore specifically disclosed herein in such environment. Turning to FIGURE 1, the mill, having roll stands 1, 2 and 3, is driven by power source P, which is connected to the mill through reduction gear 4, and pinion 5. The pinion 5 is connected to roll 1 through spindle $S_1$, which is in driving engagement with wobbler $W_1$ of the pinion and with wobbler $W_{1a}$ of the roll by means of two coupling boxes $C_1$ and $C_{1a}$.

Roll 2 is similarly connected to roll 1, and roll 3 to roll 2, by means of spindles $S_2$ and $S_3$, wobblers $W_2$, $W_{2a}$ and $W_3$, $W_{3a}$ and coupling boxes $C_2$, $C_{2a}$ and $C_3$, $C_{3a}$ respectively.

From the standpoint of the function of the invention, "wobblers" and "spindles" are substantially indistinguishable and interchangeable. Therefore, for the sake of simplicity, the term "wobbler" has been adopted herein, but it is to be understood that the term wobbler is to be interpreted to include spindles.

Figure 2:
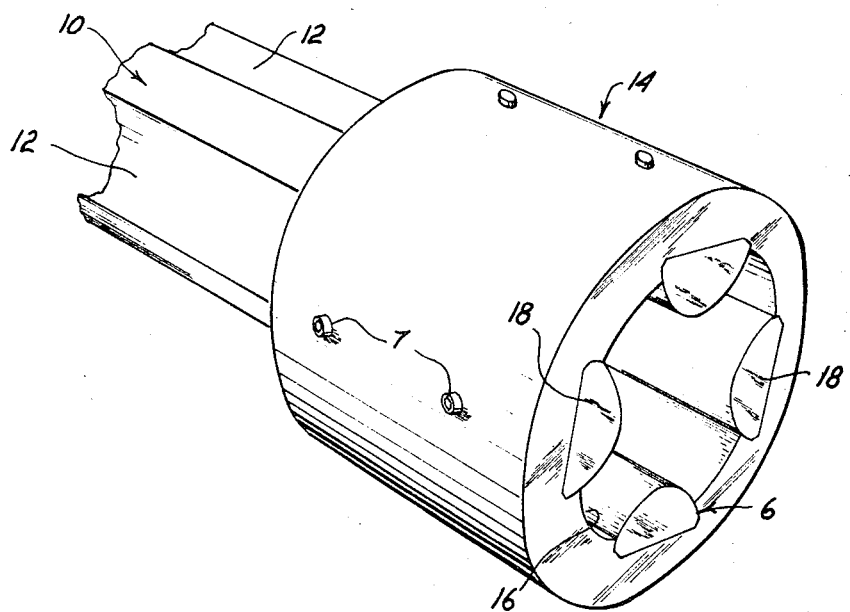
FIGURE 2 is a perspective view of a coupling box embodying the invention into which a fragment of a wobbler has been inserted.

In FIGURE 2, the wobbler is designated 10 and is a shaft-like member which has axially extending grooves 12 formed in its periphery. The coupling box 14, which is generally cylindrical and is formed like a sleeve, has an axial bore 16 therethrough.

Extending from the body of the coupling box 14 and into the bore 16 are a plurality of axially elongated teeth 18. The number of teeth 18 corresponds to the number of grooves 12 in the wobbler 10, and these teeth 18 are spaced radially so that each tooth 18 fits within a groove 12 in the wobbler 10 when the wobbler 10 is inserted into the bore 16 of the coupling box 14.

The teeth 18 may be constructed of a wide variety of materials. In my preferred embodiment, I use nylon. The term "nylon" applies to all long-chain polyamides which are the linear condensation products of dibasic acids with diamines or amino acids, for instance, polyhexamethylene adipamide (66 nylon) and polycaprolactam (6 nylon). Furthermore, these teeth 18 may be integral with the coupling body 14, or may be separable and replaceable inserts. When they are separable, they may be secured to the coupling body 14 in any suitable manner, preferably dove-tailing, as shown at 6, and may be held in place by set screws, such as 7.

Figure 6:
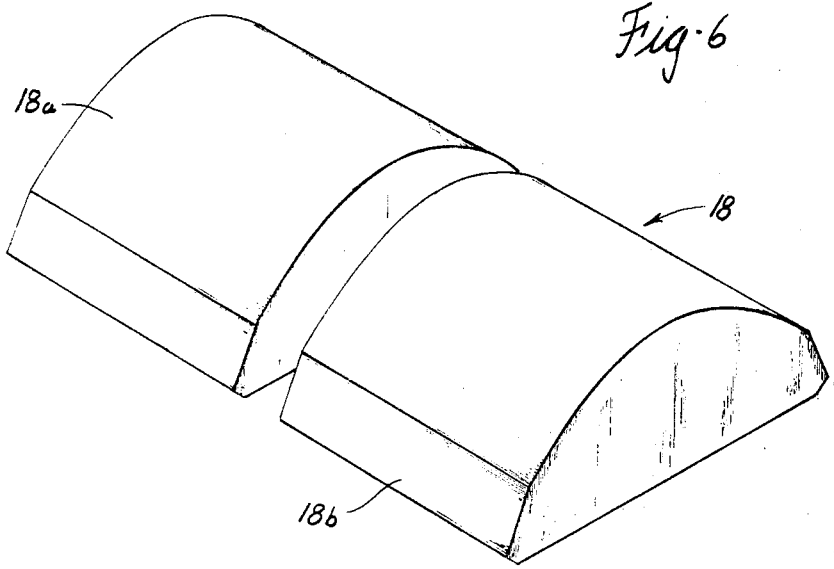
FIGURE 6 is an isometric view of another embodiment of the tooth of the invention in which the tooth is divided lengthwise into two sections.
Figure 7:
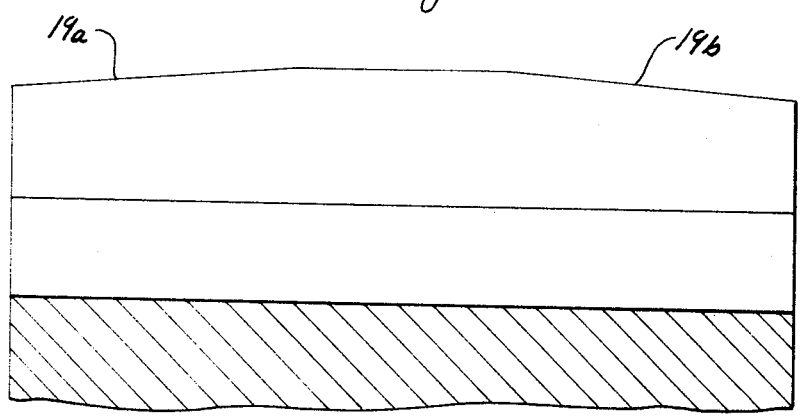
FIGURE 7 is a side view of another embodiment of the tooth of the invention in which the tooth is tapered.

As is illustrated in FIGURE 6, these tooth inserts 18 may be divided lengthwise into two sections $18_a$ and $18_b$ so that a section may be inserted into the bore from each end thereof.

These teeth 18 are advantageously tapered as at $19_a$ and $19_b$, to reduce the adverse effects of canting by the wobbler and spindle.

In the embodiment shown and described, each groove 12 has a circular profile. This profile is developed about an axis A, with a radius $R_1$ (FIG. 3). This axis A lies on the circumference of a circle 13, which is developed about the center of rotation O. The drive surfaces of a tooth 18, which are those portions of the tooth which contact a cooperating groove when the wobbler 10 and coupling box 14 are in driving inter-engagement, are developed about axes C and D (having radii $R_{1C}$ and $R_{1D}$ respectively). Axes C and D are circumferentially displaced from axis A along the circumference 13. The radii, shown as $R_{1C}$ and $R_{1D}$, for the profiles of the drive surfaces of a tooth 18 are identical to the radius for the profile of the corresponding groove 12.

The drive surface of the tooth 18 is of a geometric configuration which is complementary to that of the corresponding drive surface (those portions of a groove which contact a tooth when the two are in driving inter-engagement) of the groove 12. In other words, the drive surface of a tooth 18 will mate perfectly with the corresponding drive surface of a groove 12 when they are brought together. In the embodiment shown and described, the drive surface of a tooth 18 is cylindrical and it mates perfectly with the corresponding cylindrical drive surface of a corresponding groove 12.

As previously stated, the profile of each groove 12, and of the drive surface of each tooth 18, in the embodiment shown and described is circular, the drive surfaces of each groove 12 and tooth 18 being cylindrical. However, it should be understood that the drive surfaces of the grooves 12 and teeth 18 may be other than cylindrical. But regardless of the shape involved, the important factor is that the drive surfaces of the grooves 12 and of the teeth 18 be complementary and congruent to each other.

Clearance between a tooth 18 and its corresponding groove 12 when they are not in driving inter-engagement is provided by the circumferential displacement of the axes of development C and D along the circumference 13 and the substantially flattened-off portion 20 at the peak of the tooth 18, shown in FIGURE 3. This clearance is necessary so that the wobbler 10 may be inserted with ease into the coupling box 14, and it also allows the coupling box 14 and the wobbler 10 to be, to some minor degree, axially misaligned with respect to each other. Such misalignment may occur during the driving inter-engagement of the wobbler 10 and coupling box 14.

When a drive surface of a tooth 18 is in driving inter-engagement with the corresponding drive surface of a cooperating groove 12, the axis of development of the profile of the drive surface of that tooth is coincident with the axis of development of the cooperating groove. The complementary, cylindrical, congruent drive surfaces of the tooth and its cooperating groove are then concentric. This is illustrated in FIGURES 4 and 5. In FIGURE 4, the wobbler 10 is driving the coupling box 14. The wobbler commences to rotate, and rotates relative to the coupling box 14 until the slack or backlash is taken up. After the backlash is taken up, the wobbler and coupling box are in driving inter-engagement. This relative rotation of the wobbler 10 and coupling box 14 moves axes A and D with respect to each other and makes them coincident. In FIGURE 4, the complementary, cylindrical, congruent drive surfaces of the tooth 18 and groove 12 are concentric. Since the drive surface of the tooth 18 and the corresponding drive surface of the cooperating groove 12 are congruent, they contact each other throughout substantially all portions of these surfaces.

In FIGURE 5, the wobbler 10 is rotating in a clockwise direction. The wobbler 10 and the coupling box 14 are in driving inter-engagement, the clearance between the teeth 18 and the grooves 12 having been taken up by rotation of the wobbler 10 with respect to the coupling box 14. The complementary, cylindrical, congruent drive surfaces of the tooth 18 and groove 12 are concentric, and these congruent surfaces are in surface contact with each other.

According to the teaching of the prior art, the profile of each tooth used in such a coupling box is circular, like the profile of a cooperating groove, and is developed about the same axis as the profile of the groove is developed, but with a radius smaller than that of the groove. This is illustrated in FIGURE 3, wherein the profiles of the groove and the prior-art tooth (shown by dotted lines) are developed about axis B, having radii $R_1$ and $R_2$ respectively. In such a prior-art device, when the wobbler and coupling box are in driving inter-engagement there is line contact between the tooth and the groove, since the surface of the tooth and the surface of its cooperating groove are not congruent and complementary. Such line contact causes excessive wear to the parts in contact.

My invention has been comparison tested with devices made in accordance with the prior art. Such tests have established a marked improvement by the use of my invention. Whereas prior-art teeth show significant wear not long after their use is commenced, teeth embodying my invention show little, or insignificant, wear during the same, and even a longer period. This not only reduces capital expenditures since fewer teeth need be purchased, but also greatly reduces maintenance costs for changing worn-out teeth.

I claim:

1. In a rolling mill coupling box drive of the kind having a generally cylindrical coupling body with an axial bore therethrough and a plurality of elongated teeth projecting from said coupling body inwardly into the bore and spaced radially so that one such tooth cooperates with each groove in a wobbler when the wobbler is inserted into the bore, a tooth having a tooth drive surface of geometric configuration complementary to that of the corresponding drive surface of its cooperating wobbler groove, said drive surfaces being congruent during driving inter-engagement of the wobbler and the coupling body.

2. A construction according to claim 1 in which the tooth drive surface is a surface of a separable and replaceable tooth insert.

3. A construction according to claim 1 in which the tooth drive surface and the wobbler groove drive surface are cylindrical surfaces of common radius and which are concentric when in driving relation.

4. A construction according to claim 1 in which the profiles of the drive surfaces of said tooth and cooperating wobbler groove are developed about axes which are coincident when the drive surfaces are in driving relation and which are displaced circumferentially from each other when the drive surfaces are out of driving relation, whereby there is clearance between the drive surfaces when the wobbler and coupling body are not in driving inter-engagement.

5. A driving connection between a relatively telescoping shaft and sleeve member, the shaft member having a plurality of axially extending grooves in the periphery thereof, each groove having a drive surface, and a plurality of teeth in the sleeve member of number and position such that one tooth cooperates with each groove in the shaft member, each tooth having a drive surface which is the complement of the drive surface of the groove with which it cooperates, whereby when the shaft and sleeve members are in driving inter-engagement, the tooth and groove drive surfaces are in surface contact with each other.

6. A connection system for connecting a sleeve and a shaft member for rotation together, during which rotation one of said parts drives the other, comprising a tooth mounted on one of said parts and a tooth receiving groove formed in the other of said parts, said tooth and groove extending axially of their respective parts and being positioned thereon for inter-engagement with each other upon connection of said parts, said tooth and said groove each having generally radially extending driving surfaces, said driving surfaces when in driving inter-engagement comprising congruent surfaces which are developed about coincident axes, said tooth and said groove in non-driving engagement having clearance between them resulting from circumferential relative displacement of the axes of development of the driving surfaces, whereby to provide for limited relative angular movement of one of said parts with respect to the other upon rotation thereof to bring said axes of development into coincidence and said congruent driving surfaces into driving surface-to surface contact.

7. A driving connection between a relatively telescoping shaft and sleeve member, the shaft member having a plurality of axially extending grooves in the periphery thereof, each groove having a drive surface, and a plurality of teeth in the sleeve member of number and position such that one tooth cooperates with each groove in the shaft member, each tooth having a drive surface which has a profile identical to the profile of the drive surface of its cooperating groove, whereby when the shaft and sleeve members are in driving inter-engagement, the tooth and groove drive surfaces are in surface contact with each other.

References Cited

FOREIGN PATENTS

| | | |
|---|---|---|
| 1,352,386 | 1/1964 | France. |
| 929,544 | 6/1955 | Germany. |
| 1,018,276 | 1/1966 | Great Britain. |
| 511,033 | 1/1955 | Italy. |

HALL C. COE, *Primary Examiner.*